US012759377B2

(12) United States Patent
Avila Rodriguez et al.

(10) Patent No.: US 12,759,377 B2
(45) Date of Patent: Oct. 13, 2026

(54) VEHICLE SIDE DOOR BOLSTER

(71) Applicant: Ford Global Technologies, LLC, Dearborn, MI (US)

(72) Inventors: Mario Martin Avila Rodriguez, Cuernavaca (MX); Ruben Gallardo, Metepec (MX); Gabriel Perez Lopez, Mexico City (MX); Alan Cardenas, Cuautitlan Izcalli (MX); Victor Manuel Delgado Romero, Santa Fe (MX); Francisco Mauricio Munoz, Frac. Hacienda Lerma (MX); Jorge Aurelio Martinez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 428 days.

(21) Appl. No.: 18/454,419

(22) Filed: Aug. 23, 2023

(65) Prior Publication Data

US 2025/0065701 A1 Feb. 27, 2025

(51) Int. Cl.
*B60J 5/04* (2006.01)
*B60R 21/04* (2006.01)

(52) U.S. Cl.
CPC ........... *B60J 5/0451* (2013.01); *B60J 5/0426* (2013.01); *B60J 5/0443* (2013.01); *B60R 21/0428* (2013.01); *B60R 2021/0414* (2013.01)

(58) Field of Classification Search
CPC ........ B60J 5/0429; B60J 5/043; B60J 5/0441; B60J 5/0443; B60J 5/0445; B60J 5/0447; B60J 5/0448; B60J 5/0451; B60J 5/0452; B60J 5/0454; B60J 5/0481; B60J 5/0483; B60R 13/023; B60R 13/0243; B60R 13/025
USPC .............................. 296/146.6, 146.5, 187.12
See application file for complete search history.

(56) References Cited

U.S. PATENT DOCUMENTS

| | | | | |
|---|---|---|---|---|
| 5,395,135 | A * | 3/1995 | Lim | B60J 5/0451 296/187.05 |
| 5,636,866 | A * | 6/1997 | Suzuki | B60R 21/04 296/187.05 |
| 5,729,463 | A | 3/1998 | Koenig et al. | |

(Continued)

FOREIGN PATENT DOCUMENTS

| | | | |
|---|---|---|---|
| CN | 102372043 | A | 3/2012 |
| CN | 103646171 | A | 3/2014 |
| CN | 115402066 | A | 11/2022 |

OTHER PUBLICATIONS

Mueller, Becky. IIHS Side Impact 2.0 Barrier Development, Apr. 2020, p. 1-30, Insurance Institute for Highway Safety Highway Loss Data Institute.

(Continued)

*Primary Examiner* — Amy R Weisberg
*Assistant Examiner* — Denise Lynne Esquivel
(74) *Attorney, Agent, or Firm* — Vichit Chea; Carlson, Gaskey & Olds, P.C.

(57) ABSTRACT

A vehicle side door assembly includes a first beam, a second beam, and a bolster spanning from the first beam to the second beam. The bolster can be nylon. The bolster can include a grid of ribs that establish an array of pockets on an outboard side of the bolster, and a grid of ribs that establish another array of pockets on an inboard side of the bolster.

7 Claims, 4 Drawing Sheets

(56) References Cited

U.S. PATENT DOCUMENTS

| | | | | |
|---|---|---|---|---|
| 5,755,484 | A * | 5/1998 | Chou | B60J 5/0447 296/146.7 |
| 5,934,730 | A * | 8/1999 | Yagishita | B60J 5/0451 296/146.7 |
| 6,039,387 | A * | 3/2000 | Choi | B60J 5/0427 296/187.12 |
| 6,096,086 | A | 8/2000 | Weber et al. | |
| 6,110,216 | A | 8/2000 | Weber et al. | |
| 6,203,096 | B1 * | 3/2001 | Noda | B60R 21/0428 296/146.7 |
| 6,477,517 | B1 | 11/2002 | Limaiem et al. | |
| 6,955,391 | B1 | 10/2005 | Peng | |
| 7,133,812 | B1 | 11/2006 | Weber et al. | |
| 7,237,825 | B1 | 7/2007 | Tilli et al. | |
| 7,306,081 | B2 * | 12/2007 | Tamada | F16F 9/0481 188/371 |
| 7,857,375 | B2 * | 12/2010 | Huttsell | B60R 21/0428 296/187.05 |
| 7,992,920 | B2 * | 8/2011 | Deng | B60J 5/042 296/187.12 |
| 8,029,041 | B2 * | 10/2011 | Hall | B60J 5/0451 296/146.7 |
| 8,272,679 | B2 * | 9/2012 | Deng | B60J 5/0451 296/187.12 |
| 9,522,646 | B2 | 12/2016 | Tamada et al. | |
| 2002/0171260 | A1 * | 11/2002 | Schneider | B60J 5/0452 296/146.6 |
| 2004/0113455 | A1 * | 6/2004 | Schmidt | B60J 5/0455 296/146.6 |
| 2007/0013206 | A1 * | 1/2007 | Huttsell | B60J 5/0451 296/187.12 |
| 2007/0222257 | A1 * | 9/2007 | Flendrig | B60J 5/0447 296/146.6 |
| 2008/0164716 | A1 | 7/2008 | Frank | |
| 2009/0026800 | A1 * | 1/2009 | Asenkerschbaumer | B60J 5/0451 296/187.05 |
| 2014/0110964 | A1 * | 4/2014 | Schijve | B60J 5/0429 29/527.1 |
| 2015/0202950 | A1 * | 7/2015 | Garimella | B60J 5/048 49/501 |
| 2016/0275235 | A1 | 9/2016 | Cischke et al. | |
| 2019/0141467 | A1 | 5/2019 | Breed | |
| 2021/0138881 | A1 * | 5/2021 | Boettcher | B23K 20/24 |
| 2022/0089237 | A1 | 3/2022 | Sverdlov et al. | |
| 2023/0302880 | A1 * | 9/2023 | Harrington | B60J 5/0493 |

OTHER PUBLICATIONS

Ghadianlou, et al. Crashworthiness design of vehicle side door beams under low-speed pole side impacts, Thin-Walled Structures, vol. 67, Jun. 2012, p. 25-33, (Mar. 19, 2026).

Gosavi, et al. Design and Analysis of Side Door Intrusion Beam for Automotive Safety, International Journal of Innovative Research in Technology, Jun. 2022, vol. 9, Issue 1.

Zhao, et al. Whole Car Side Impact Mode and Response Evaluation, Procedia Engineering 19 (2012) 2667-2671, 2012 International Workshop on Information and Electronics Engineering.

* cited by examiner

VEHICLE SIDE DOOR BOLSTER

TECHNICAL FIELD

This disclosure relates generally to managing loads during vehicle loading events.

BACKGROUND

Vehicles can experience various loads. Side doors of the vehicle can include various structures that help to manage loads applied to, among other things, the outboard sides of the vehicle.

SUMMARY

In some aspects, the techniques described herein relate to a vehicle side door assembly, including: a first beam; a second beam; and a bolster spanning from the first beam to the second beam.

In some aspects, the techniques described herein relate to an assembly, wherein the first beam is a vertically upper beam, and the second beam is a vertically lower beam.

In some aspects, the techniques described herein relate to an assembly, wherein the bolster is directly attached to both the first beam and the second beam.

In some aspects, the techniques described herein relate to an assembly, wherein the bolster is attached to both the first beam and the second beam using a plurality of mechanical fasteners.

In some aspects, the techniques described herein relate to an assembly, wherein the bolster includes at least one array of pockets.

In some aspects, the techniques described herein relate to an assembly, wherein the bolster has an inboard side having an array of inboard pockets and an outboard side having an array of outboard pockets.

In some aspects, the techniques described herein relate to an assembly, wherein the inboard pockets and the outboard pockets have a rectangular profile.

In some aspects, the techniques described herein relate to an assembly, wherein the array of inboard pockets is a first array of inboard pockets within a first bolster section and the array of outboard pockets is a first array of outboard pockets within the first bolster section, and further including a second array of inboard pockets within a second bolster section and a second array of outboard pockets within the second bolster section, the first bolster section spaced a distance from the second bolster section.

In some aspects, the techniques described herein relate to an assembly, further including a connecting arm that connects the first bolster section to the second bolster section.

In some aspects, the techniques described herein relate to an assembly, wherein the bolster has an inboard side having an grid of inboard ribs and an outboard side having an array of outboard rib.

In some aspects, the techniques described herein relate to an assembly, further including a side door inner panel and a side door outer panel, wherein the first beam, the second beam, and the bolster are disposed between the side door inner panel and the side door outer panel.

In some aspects, the techniques described herein relate to an assembly, wherein the first beam and the second beam are a metal or metal alloy, wherein the bolster is a polymer-based material.

In some aspects, the techniques described herein relate to an assembly, wherein the bolster is nylon.

In some aspects, the techniques described herein relate to an assembly, wherein the first beam and the second beam are a metal or metal alloy, wherein the bolster is a polymer-based material.

In some aspects, the techniques described herein relate to an assembly, further including a snap-fit feature of the bolster configured to snap-fit the bolster to the first beam or the second beam.

In some aspects, the techniques described herein relate to a method of managing loads within a vehicle side door, including: receiving a load at a side door of a vehicle; and distributing at least some of the load through a bolster that spans between a first beam and a second beam of the side door.

In some aspects, the techniques described herein relate to a method, wherein the bolster is polymer-based, and the first and second beams are a metal or metal alloy.

In some aspects, the techniques described herein relate to a method, wherein the bolster includes an array of inboard pockets on an inboard side of the bolster and an outboard array of pockets on an outboard side of the bolster.

In some aspects, the techniques described herein relate to a method, further including snap-fitting the bolster to at least one of the first beam or the second beam.

In some aspects, the techniques described herein relate to a method, wherein the bolster has an inboard side having an grid of inboard ribs and an outboard side having an grid of outboard ribs.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a bolster for use in a side door of a vehicle. The bolster can, among other things, help to manage loads applied to the vehicle, particularly a load applied to a side of the vehicle.

Figure 1:
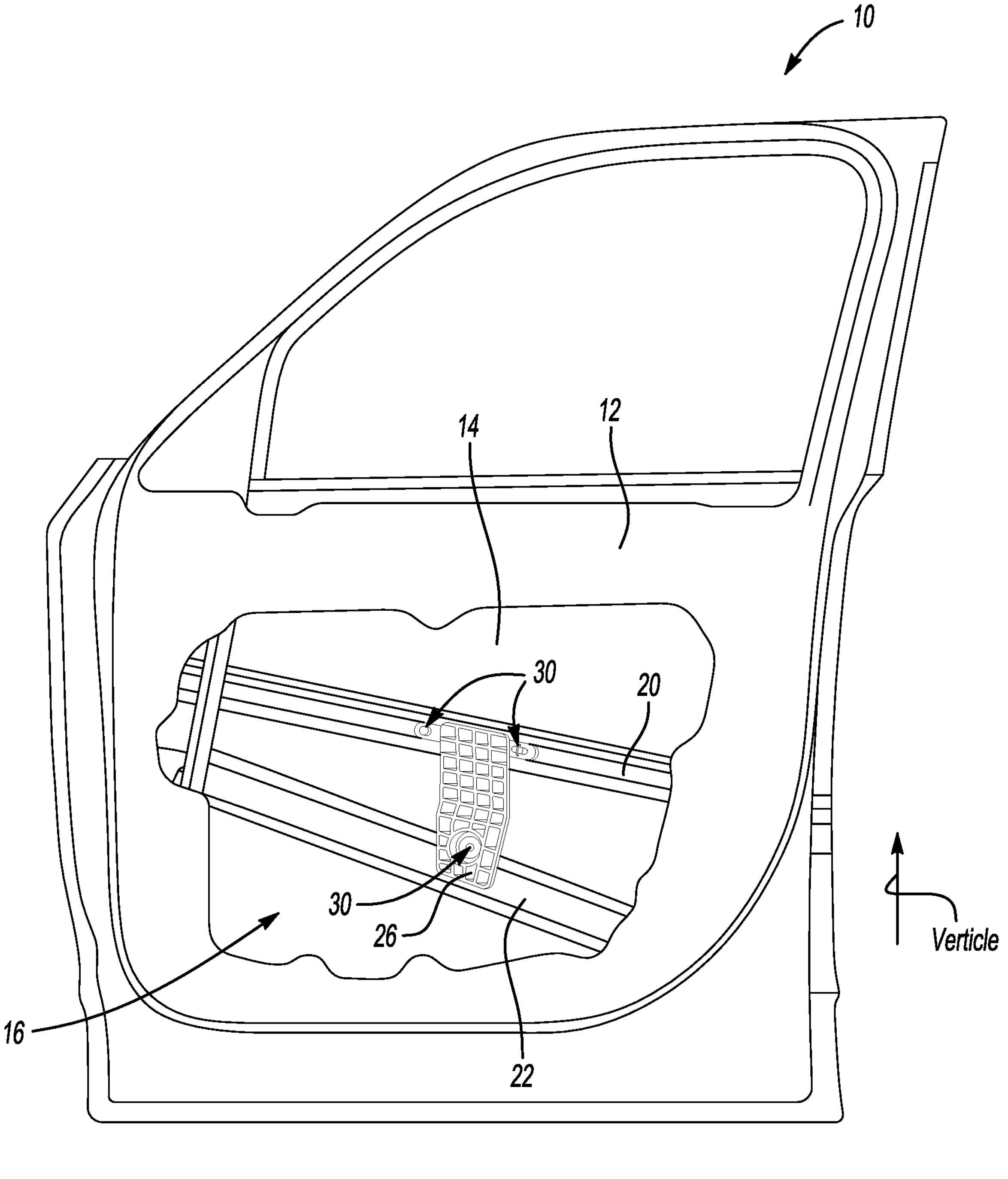
FIG. 1 illustrates a side view of selected portions of a side door assembly for a vehicle.

With reference to FIG. 1, a side door 10 includes an inner panel 12 and an outer panel 14. An inboard facing side of the side door 10 is shown in FIG. 1. The inner panel 12 and the outer panel 14 are joined. The side door 10 includes an interior area 16 between the inner panel 12 and the outer panel 14. Various components can be contained within the interior area 16, such as latches, window actuators, etc.

In this example, the side door 10 includes a first beam 20 and a second beam 22, and a bolster 26. The first beam 20, the second beam 22, and the bolster 26 are held within the interior area 16 of the side door 10 and are disposed between the inner panel 12 and the outer panel 14. The first beam 20 is a vertically upper beam. The second beam 22 is a vertically lower beam. Vertical, for purposes of this disclosure, is with reference to ground in a general orientation of the side door 10 when installed within a vehicle.

The first beam 20 and the second beam 22 are reinforcement beams in this example. The first beam 20 and the second beam 22 are a metal or metal alloy material. The first beam 20 and the second beam 22 can be considered body in white (BIW) beams.

The first beam 20 and the second beam 22 can help to reinforce the side door 10. The first beam 20 and the second beam 22 can help to manage loads applied to the side door 10. In this example, the bolster 26 is incorporated into the side door 10 to help manage loads applied to the side door 10 and the vehicle to which the side door 10 is attached.

Figure 2:
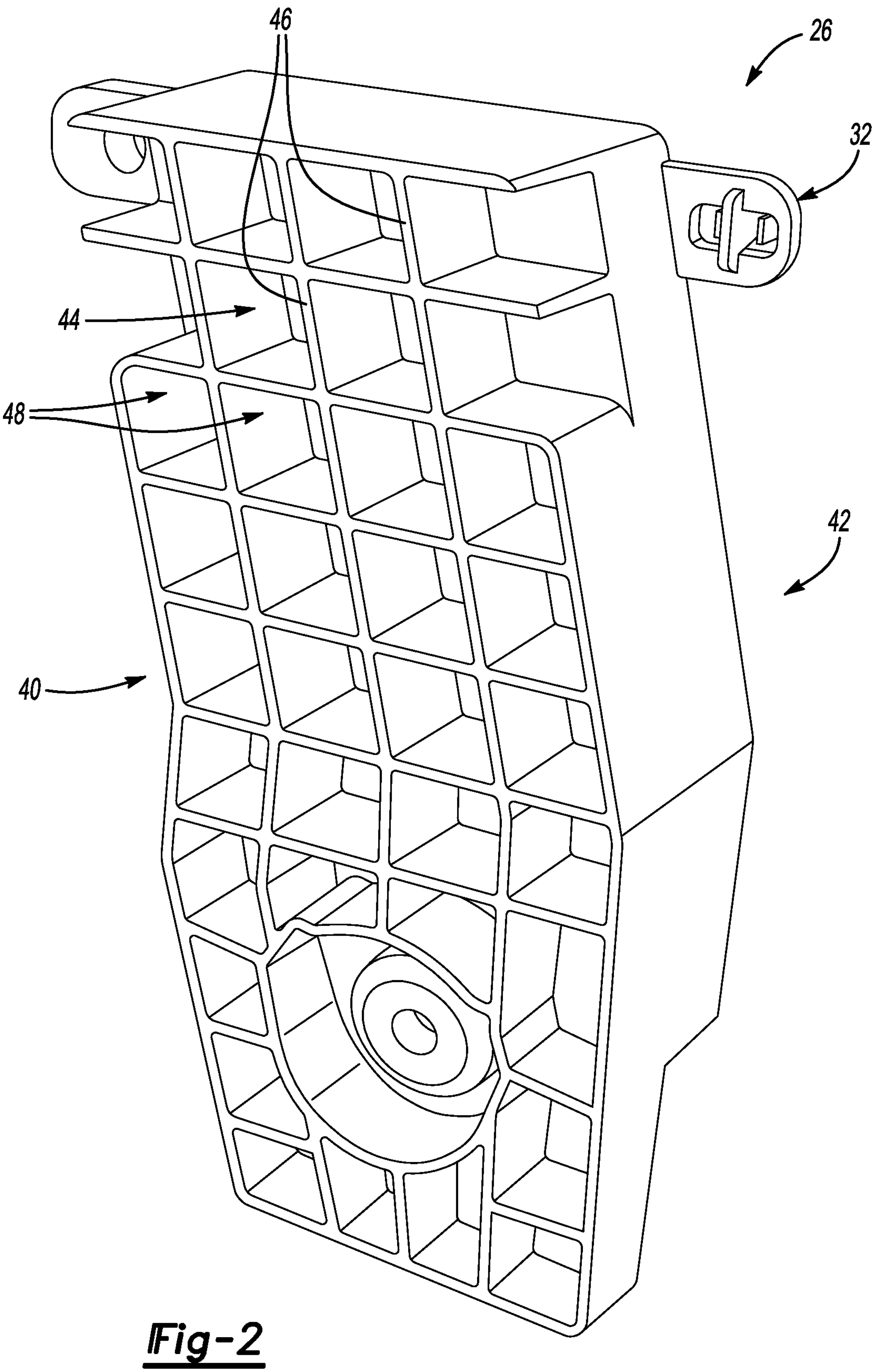
FIG. 2 illustrates a perspective view of an inboard side of a bolster from the side door assembly of FIG. 1.
Figure 3:
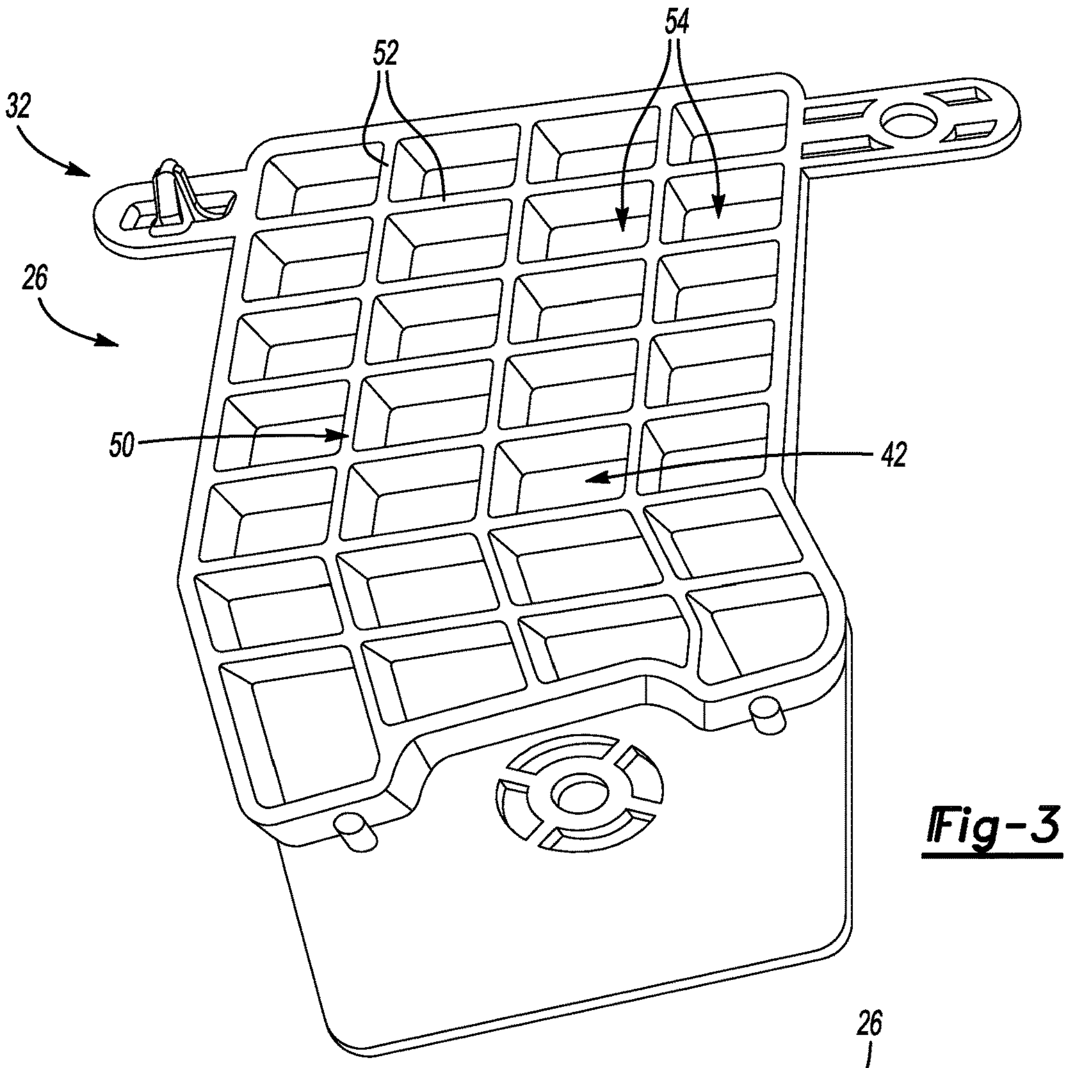
FIG. 3 illustrates a perspective view of an outboard side of the bolster of FIG. 2.
Figure 4:
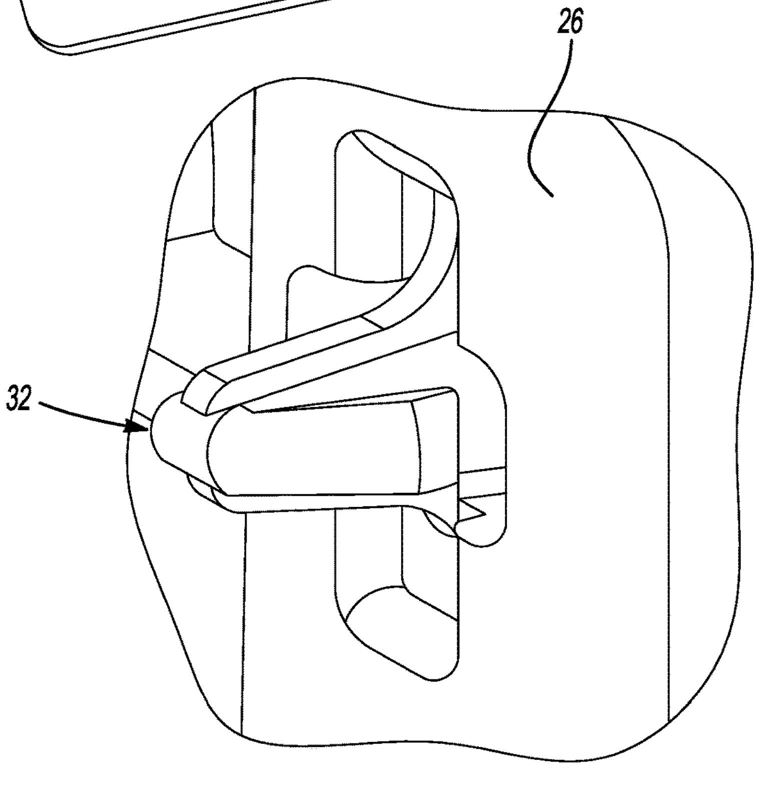
FIG. 4 illustrates a closeup view of an area of FIG. 3.

With reference now to FIGS. 2-4 and continued reference to FIG. 1. The bolster 26 spans between the first beam 20 and the second beam 22. The bolster 26 is directly attached to both the first beam 20 and the second beam 22. In this example, a plurality of mechanical fasteners 30 attach the bolster 26 to the first beam 20 and the second beam 22.

The bolster 26 incorporates a snap-fit feature 32, which can snap-fit the bolster 26 to, in this example, the first beam 20. The snap-fitting of the snap-fit feature 32 to the first beam 20 can hold a position of the bolster 26 while securing the mechanical fasteners 30. The snap-fit feature 32 thus provides an assembly aid.

The bolster 26 can be a polymer-based resin component. In this particular example, the bolster 26 is nylon.

The bolster 26 has an inboard side 40 and an opposite outboard side 42. The inboard side 40 has a grid 44 of inboard ribs 46. The grid 44 of inboard ribs 46 establishes an array of inboard pockets 48 within the inboard side 40 of the bolster 26. The outboard side 42 of the bolster 26 includes a grid 50 of outboard ribs 52. The grid 50 of outboard ribs 52 establishes an array of outboard pockets 54 within the bolster 26.

The inboard pockets 48 and the outboard pockets 54 have rectangular profiles in this example. In other examples, the inboard pockets 48 and the outboard pockets 54 could have other profiles, such as a hexagonal profile. A width of the inboard pockets 48 and the outboard pockets 54 is about 23 to 25 millimeters in this example. The inboard ribs 46 and the outboard ribs 52 are about 3 millimeters thick.

The grid 44 of inboard ribs 46 and the grid 50 of outboard ribs 52 reinforce areas of the bolster 26 to facilitate managing of loads applied to the side door 10. The bolster 26 is reinforced without requiring significant additional material. As a load is applied to, for example, the outer panel 14, the side door 10 receives the load. At least some of the load is distributed through the bolster 26.

Figure 5:
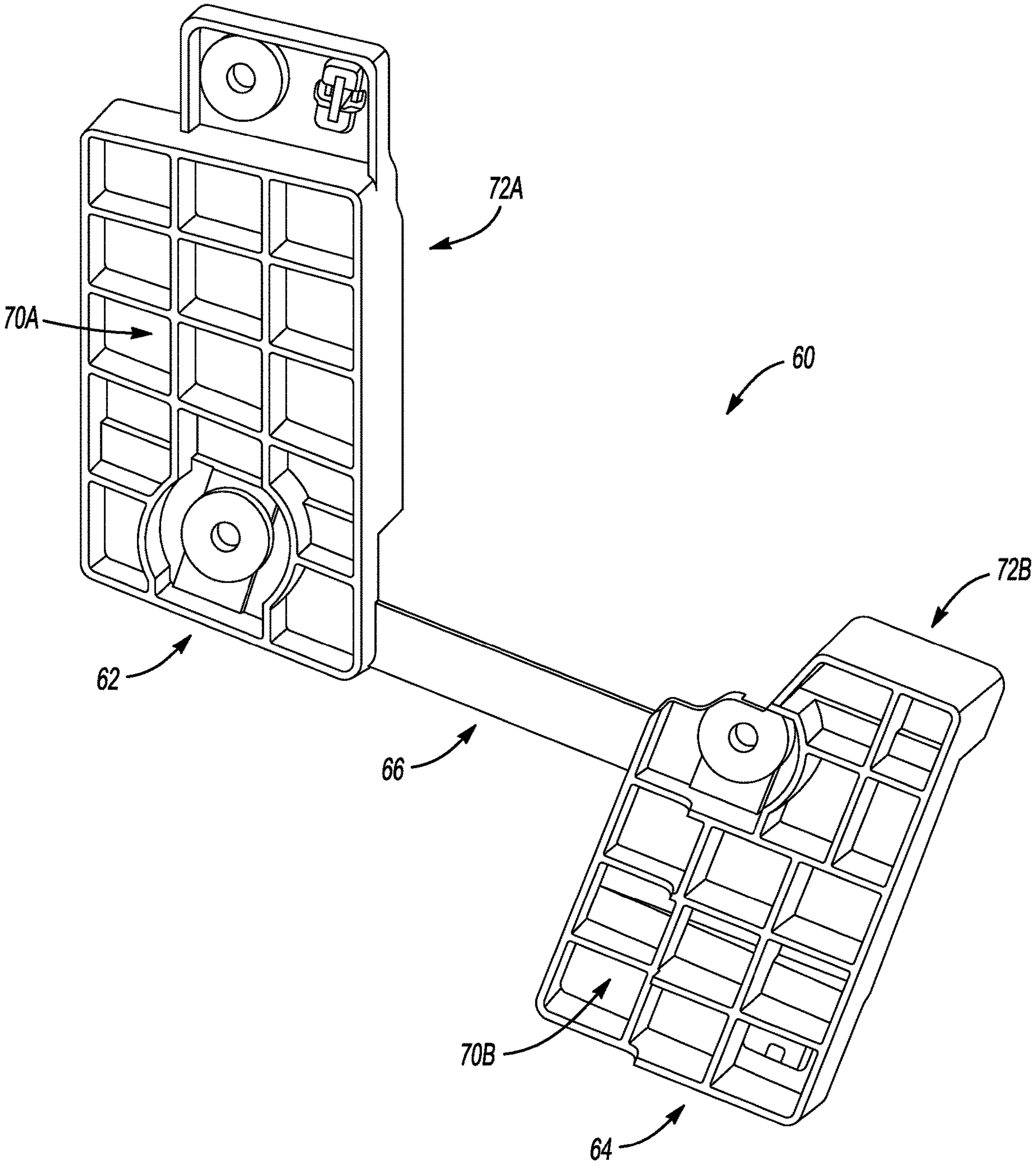
FIG. 5 illustrates a bolster according to another exemplary embodiment of the present disclosure for use in a side door assembly.

The example bolster 26 includes a single array of the inboard pockets 48 and a single array of the outboard pockets 54. With reference to FIG. 5, a bolster 60 according to another exemplary embodiment of the present disclosure includes a first bolster section 62, a second bolster section 64, and a connecting arm 66 that joins the first bolster section 62 to the second bolster section 64. The bolster 60 is molded as a singular piece that includes the first bolster section 62, the second bolster section 64, and the connecting arm 66. The bolster 60, like the bolster 26, is configured to attach to and span between first and second door beams.

In the example bolster 60, the first bolster section 62 includes a first array of inboard pockets 70A and the second bolster section 64 includes a second array of inboard pockets 70B. Further, the first bolster section 62 includes a first array of outboard pockets 72A, and the second bolster section 64 includes a second array of outboard pockets 72B. The first bolster section 62 is spaced a distance from the second bolster section 64, and connected by the connecting arm 66. Thus, the bolster 60 includes separate and distinct arrays of pockets on the inboard side and separate and distinct arrays of pockets on the outboard side.

Referring again to FIGS. 1-4 with continued reference to FIG. 5, the bolsters 26 and 60 can help to absorb loads applied to the side door 10. As the bolsters 26 and 60 utilize pockets and ribs, structural integrity of the bolsters 26 and 60 can be maintained without requiring extra material.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle side door assembly, comprising:

a first beam;

a second beam; and a bolster spanning from the first beam to the second beam, the bolster directly attached to both the first beam and the second beam using a plurality of mechanical fasteners that extend through the bolster to engage the first beam or the second beam, wherein the bolster has an inboard side having an array of inboard pockets and an outboard side having an array of outboard pockets, wherein the array of inboard pockets is a first array of inboard pockets within a first bolster section and the array of outboard pockets is a first array of outboard pockets within the first bolster section, and further comprising a second array of inboard pockets within a second bolster section and a second array of outboard pockets within the second bolster section, the first bolster section spaced a distance from the second bolster section, wherein first and second grids of inboard ribs respectively define the first and second arrays of inboard pockets, wherein first and second grids of outboard ribs define the first and second arrays of outboard pockets, and further comprising a connecting arm that connects the first bolster section to the second bolster section, the connecting arm lacking rib-defined cavities.

2. The assembly of claim 1, wherein the first beam is a vertically upper beam, and the second beam is a vertically lower beam, wherein at least one of the mechanical fasteners extends through a first aperture in the bolster into the vertically upper beam, and at least one of the mechanical fasteners extends through a second aperture in the bolster into the vertically lower beam.

3. The assembly of claim 1, wherein the inboard pockets and the outboard pockets have a rectangular profile.

4. The assembly of claim 1, further comprising a side door inner panel and a side door outer panel, wherein the first beam, the second beam, and the bolster are disposed between the side door inner panel and the side door outer panel.

5. The assembly of claim 1, wherein the first beam and the second beam are a metal or metal alloy, wherein the bolster is a polymer-based material.

6. The assembly of claim 5, wherein the bolster is nylon-based.

7. The assembly of claim 1, further comprising a snap-fit feature of the bolster configured to snap-fit the bolster to the first beam or the second beam.

* * * * *